United States Patent

[11] 3,610,700

| [72] | Inventors | Siegfried Beck<br>Stuttgart-Moehringen;<br>Manfred Siebold, Boeblingen, both of Germany |
|---|---|---|
| [21] | Appl. No. | 29,450 |
| [22] | Filed | Apr. 17, 1970 |
| [45] | Patented | Oct. 5, 1971 |
| [73] | Assignee | Robert Bosch GmbH<br>Stuttgart, Germany |
| [32] | Priority | May 13, 1969 |
| [33] | | Germany |
| [31] | | P 19 24 339.1 |

[54] VEHICLE BRAKE SYSTEM
12 Claims, 1 Drawing Fig.

[52] U.S. Cl. ............................................. 303/9,
303/2, 303/13, 303/72
[51] Int. Cl. ..................................... B60t 13/42,
B60t 15/00
[50] Field of Search............................. 303/2, 9,
13, 72, 74–75

[56] References Cited
UNITED STATES PATENTS

| 3,116,095 | 12/1963 | Leighton ..................... | 303/9 |
| 3,273,950 | 9/1966 | Vielmo........................ | 303/9 |
| 3,443,839 | 5/1969 | Hinrichs et al................ | 303/9 X |

*Primary Examiner*—Milton Buchler
*Assistant Examiner*—John J. McLaughlin
*Attorney*—Michael S. Striker

ABSTRACT: A backup unit for actuating the brakes of a vehicle in the event of failure of the fluid-pressure-operated main vehicle braking unit. The backup unit has a first cylinder in which a piston is fluidtightly shiftable to a position actuating the vehicle brakes. A spring at one side of the piston urges the same to the aforementioned position. A first passage connects a fluid-pressure reservoir which supplies the main brake system with the first cylinder at the other side of the piston so that in response to the fluid pressure the piston is urged away from the aforementioned position. A check valve normally permits fluid flow only in a direction into the first cylinder. A second cylinder is provided in which a control member is shiftable to and away from a control position in which it displaces the check valve in order to permit the flow of fluid out of the first cylinder. A biasing spring urges the control member from one side thereof to the control position, and a second passage communicates with the second cylinder at the other side of the control member and with the reservoir so that the control member is urged by fluid pressure away from the control position. A control unit is manually operable by a vehicle operator and includes a pair of valves respectively provided in the first and second passages and actuatable by the operator to vent the first and second passages so that, in response to the resulting pressure drop, the control member will move to control position and thereby open the check valve so that fluid can flow out of the first cylinder, permitting the biasing spring thereof to urge the piston to its brake-operating position.

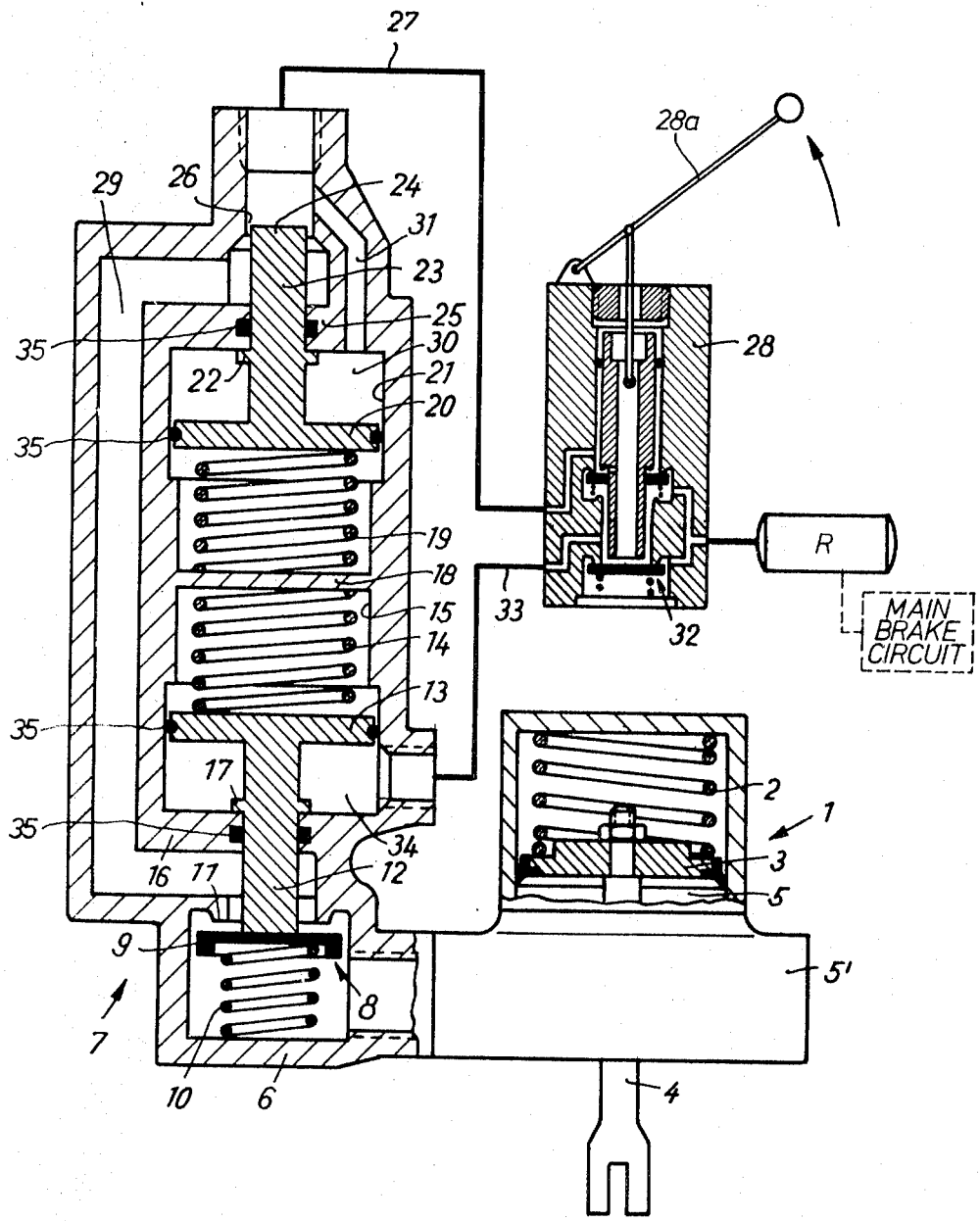
INVENTORS
Siegfried BECK
Manfred SIEBOLD
BY

VEHICLE BRAKE SYSTEM

BACKGROUND OF THE INVENTION

The present invention relates generally to vehicle brake systems and more particularly to brake systems for automotive vehicles. Still more specifically the present invention relates to a backup brake system or circuit serving to actuate the vehicle brakes in the event the main fluid-operated brake system of the vehicle fails.

It is known, for instance from German Pat. 828,640 to provide such a backup brake circuit or system which utilizes a spring-biased piston for actuating the brakes, with the piston being displaced and maintained in operative position against the urging of the biassing spring as long as the pressure of fluid operating the main braking system does not drop below a certain value. The backup system in this known construction is operated by the manual brake, so that if the vehicle operator utilizes the manual brake on realizing the failure of the main fluid-operated braking system, the backup system comes into operation. However, with this construction—where the release is effected mechanically—great complexity is unavoidable, particularly in a braking installation utilizing individual braking cylinders, the reason being the need for the so-called Bowden-linkage with its necessary reversing rollers or levers which must be associated with each of the individual brake cylinders. Of course, a corollary of the complexity is the frequent need for servicing and repairs, not to mention the initial cost of construction.

SUMMARY OF THE INVENTION

It is, accordingly, an object of the present invention to provide a simple vehicle backup braking system or circuit not possessed of the aforementioned disadvantages.

A further object of the invention is to provide such a backup system in which even if the fluid pressure has dropped to an unacceptable level, the backup system is activated only in case of need via a separate valve provided for the purpose.

A concomitant object of the invention is to provide such a system which initiates the braking action not suddenly but gradually when activated, particularly if the brake-fluid line is reached and the manual brake controlling the backup system is subsequently used.

In pursuance of the above objects, and others which will become apparent hereafter, one feature of the invention resides in a vehicle brake system having a fluid-operated main braking circuit for actuating the vehicle brakes and reservoir means communicating with the main braking circuit and normally containing braking fluid under pressure. In such a system the invention provides a backup braking circuit for actuating the vehicle brakes in the event of failure of the main braking circuit due to lack of fluid pressure in the reservoir means. The backup circuit comprises, in accordance with one feature of the invention, a braking unit having a first cylinder, a piston fluid-tightly shiftable in said first cylinder between two positions in one of which it actuates the vehicle brakes, and biassing means at one side of the piston and permanently urging the same to its one position. First passage means connects the reservoir means with the first cylinder at the other side of the piston so that the latter is urged by fluid pressure to the other of its positions counter to the biassing means. A check valve is provided in the passage means for normally permitting fluid flow only in direction into the first cylinder. A control circuit for the check valve is also provided, comprising a second cylinder, a control member shiftable in the second cylinder to and away from a control position in which it displaces the check valve in a sense permitting fluid flow out of the first cylinder, a biassing element urging the control member from one side to its control position, and second passage means which communicates with the second cylinder at the other side of the control member and with the reservoir means so that the control member is urged by fluid pressure away from its control position. Finally, a control unit is provided which is manually operable by a vehicle operator and comprises a first and a second control valve in the first and second passage means, respectively, such valves being actuatable in response to operation of the control unit for the purpose of venting the first and second passage means. When this occurs, the control circuit displaces the check valve in a sense which permits fluid to flow out of the first cylinder of the braking unit, whereupon the biassing means of the braking unit is capable of displacing the piston to the brake-actuating position.

In order to ensure that actuation of the brakes is not sudden by gradual, in order to avoid the possibility of an accident resulting from sudden application of the brakes, throttling means is provided in accordance with a further concept of the invention which is associated with the first passage means intermediate the check valve and the first control valve and which serves to throttle the flow of fluid out of the first cylinder of the braking unit in automatic response to a predetermined drop of pressure in the first passage means, which pressure drop may occur either as a result of venting of the first passage means due to operation of the control unit by the operator, or—unknown to the operator at the time of occurence—due to breaching of the first passage means by a rupture or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a somewhat diagrammatic illustration showing a backup braking circuit according to the present invention.

DESCRIPTION OF THE PREFERRED EMBODIMENTS

Discussing now the drawing in detail it will be seen that reference character R identifies a reservoir for fluid under pressure, such as compressed air. As the broken line illustration shows, the reservoir supplies fluid under pressure to the main brake circuit which need not be discussed because in itself it does not constitute a part of the present invention and in any case is well known to those skilled in the art.

In addition, however, there is provided a backup braking circuit according to the present invention. This utilizes a cylinder 1 in which a piston 3 is accommodated and fluid-tightly displaceable between two positions. A spring 2 engages the piston 3 at one side and permanently urges it to one of the positions. The piston 3 is provided with a piston rod 4 which is connected in nonillustrated suitable and well-known manner with a nonillustrated vehicle brake which also forms no part of the present invention. When the piston 3 is in the position to which the spring 2 permanently attempts to move it, that is the position illustrated in the drawing, it has activated the vehicle brake. At the side of the piston 3 which is opposite the spring 2 there is a working chamber 5 in the piston 1. This chamber 5 is closed by a cover 5' which is mounted in suitable manner on a housing 6 of a valve unit 7.

As the drawing shows, the valve unit 7 accommodates a check valve 8 composed of a valve member 9 and a valve spring 10 which permanently tends to urge the valve member 9 into engagement with a valve seat 11. A cylinder 15 is provided in which there is accommodated a control member or control piston 13 slidable to and from the control position in which it is shown in the drawing. A spring 14 permanently urges the piston 13 to the illustrated position and a projection or rod 12 provided on the piston 13 extends into engagement with the valve member 9 when the piston 13 is in the illustrated position, displacing the valve member 9 out of contact with the valve seat 11. The rod 12 extends through an aperture in a wall 16 in which it is guided, reference numeral 35 identifying a conventional seal. In fact, it is pointed out here that the various seals shown in the drawing are uniformly identified with reference numeral 35 and require no description because their purpose and configuration is evident to those skilled in the art. An annular abutment shoulder 17 provided on the projection 12 engages the wall 16 when the piston is in the illustrated control position to prevent the piston 13 from movement beyond this position.

A further cylinder 21 is axially aligned with the cylinder 15 as illustrated, with the two being separated by an end wall 18 common to them both. The spring 14 abuts against this end wall, just as a second spring 19 abuts against the end wall 18 but is located in the cylinder 21 and therein tends to permanently displace to a throttling position a throttling member or throttling piston 20 which is also axially aligned with the piston 13 and whose projection 23 extends through an aperture in a housing wall 25, with a seal 35 again being provided. The projection 23 also has an annular abutment shoulder 22 which engages the housing wall 25 when the piston 20 is in the illustrated throttling position. The free end portion 24 of the projection 23 serves as a throttling portion as will be discussed subsequently. It will be noted, incidentally, that the pistons 13 and 20 and their associated projections 12 and 23 are of identical dimensions and configurations. This reduces further the expense involved in constructing the device.

A brake fluid passage 27 communicates with a manually operable control unit 28 which is still to be described, and has a portion 26 into which the throttling portion 24 can extend and from which it can be withdrawn. Thus, the cross-sectional area of the portion 26 can either be unobstructed or decreased or throttled, depending upon whether the throttling portion 24 is withdrawn from the passage portion 26 or extends into the same as illustrated. The longitudinal bore or passage portion 29 connects the passage portion 26 with the check valve 8 and communicates via the same with the chamber 5. A further passage 31 communicates with the passage portion 26 and with a chamber 30 at that side of the piston 20 in the cylinder 21 which is opposite the spring 19. More generally speaking, the passage 31 communicates with the brake fluid passage 27 intermediate the manually operable control unit 28 and the throttle constituted by the portion 26 and the associated throttling portion 24; the point of communication should be adjacent the throttle but upstream thereof so that the movement of the piston 20 and the associated projection 23 with the throttling portion 24 into and out of throttling position is dependent upon the pressure prevailing at the aforementioned point. In this manner the movement of the piston 20 to throttling position is dependent upon the pressure in the brake fluid passage 27.

The manually operable control units 28 comprise a known brake valve which, when the operating lever 28a is displaced to the illustrated position in the direction of the arrow, interrupts a connection between the passage 27 and the reservoir R and causes the passage 27 to be vented. In addition, there is provided in the unit 28 a further and more specifically a double-seated valve 32 which is opened when the lever 28a is not in the illustrated position and constitutes a connection between the reservoir R via a further passage 33 with a chamber 34 which is located in the cylinder 15 at that side of the piston 13 which is opposite the spring 14.

In operation of the novel device the reservoir R is in communication with the passages 27 and 33 when the lever 28a of the unit 28 is in nonoperated position, that is when it is downwardly displaced from the position illustrated. When this occurs, fluid pressure in the chambers 30 and 34 causes the pistons 20 and 13 to be displaced to their respective rest positions in the direction towards the common wall 18 oppositely the biassing action of their respectively associated biassing springs 19 and 14.

The cross-sectional area of the passage portion 26 is already completely unobstructed—due to withdrawal of the throttling portion 24—when the pressure in the passage 27 rises to one atmosphere overpressure, and the pressure in the passage 27 is communicated via the passage portions 26 and 29 to the check valve 8 which, while in closed position in which it does not prevent the flow of pressurized fluid out of the chamber 5, can be displaced away from the valve seat 11 by the pressure in the passage portion 29 so as to permit the flow of pressurized fluid into the chamber 5. As a result of this the piston 3 is displaced to inoperative position, that is upwardly in the illustration, compressing its spring 2. No throttling and no delaying of fluid flowing through the passage 27 via the passage portion 26, the passage portion 29 and the check valve 8 into the chamber 5 occurs under these circumstances. A reverse flow is prevented by the check valve 8.

Assuming, now, that the operator on attempting to use his main brake circuit finds that the main brake circuit is inoperative, for instance due to lack of pressure in the reservoir means R, he moves the lever 28a in the direction of the arrow to the illustrated position. In other words, he utilizes the backup brake system or circuit. This causes firstly an operation of the valve 32 whereby the passage 33 is vented so that, due to the release of pressure in the chamber 34, the spring 14 is able to displace the piston 13 downwardly to the illustrated position, as a result of which the projection 12 displaces the valve member 9 of the check valve 8 oppositely the urging of the spring 10 out of engagement with the valve seat 11. The second valve in the unit 28 is also actuated but with a momentary delay relative to the actuation of the valve 32, thereby venting the passage 27. Because the check valve 8 is open fluid under pressure escapes from the chamber 5 past the check valve 8 and through the passage portions 29, 26 into the passage 27 and is vented therefrom. As a result of this the spring 2 is capable of displacing the piston 3 to the illustrated operative position thereof in which the vehicle brake is activated via the piston rod 4 connected in suitable manner with the brake.

As venting of fluid out of the chamber 5 occurs, a simultaneous venting of the pressure from chamber 30 takes place via the passage 31, the passage 27 and the nonillustrated venting valve in the unit 28. The spring 19 is thus now able to displace the piston 20 to its illustrated throttling position in which—assuming that the pressure in the pressure 27 drops to 1 atmosphere overpressure—the throttling pressure 24 of the projection 23 enters into the passage portion 26 thereby decreasing the free cross-sectional area thereof and providing a throttle. However, the piston 3 has been displaced to its illustrated operating position by the spring 2 at the time when the pressure decreased to approximately 2.8 atmospheres overpressure, so that the brakes are already fully operated by the time the throttle comes into existence so that it is always guaranteed that during the braking operation no throttling of the outflowing fluid occurs and no delay in the braking will take place. The movement of the throttling portion 24 into the passage portion 26, thereby establishing the throttle, takes place only when the pressure in the passage 27 drops to approximately 1 atmosphere, that is after the piston 3 has fully operated the brakes of the vehicle.

On the other hand, if the passage 27 is breached, as by breakage, the piston 3 will not operate because the backup valve is closed. However, the piston 20 will move to its illustrated upper position because the pressure fluid is vented from the chamber 30 via the passage 31 into the breached passage 27. This causes the portion 24 to enter into the portion 26 so that the throttle is now in effect. If in this case the unit 28 is activated by an operator, by displacing the handle or lever 28a in the direction of the arrow to the illustrated position, then the chamber 34 is vented as before, the piston 13 moves downwardly to the illustrated position in which it opens the check valve 8, and the compressed fluid can escape from the chamber 5 via the open check valve 8 and the passage portion 29 past the throttle into the passage 27. Because the passage 27 is breached, no pressure can develop in the passage as a result of the fluid flowing into it from the chamber 5, so that the passage 31 and the chamber 30 continue to remain unpressurized with the result that the piston 20 and the portion 24 remain in their illustrated position and the throttle remains in effect. This, on the other hand, assures that the outflow of fluid from the chamber 5 past the throttle is delayed substantially, and in turn this of course results in a significant delay in the venting of the chamber 5 and thereby of movement of the piston 3 to its illustrated operating position. In turn, this causes a delay in the full operation of the brakes by the piston 3, so that sudden stoppage of the vehicle is avoided and the vehicle is gradually brought to a halt, avoiding the possibility of accidents particularly to vehicles behind or otherwise in the vicinity of the vehicle provided with the system according to the present invention.

It will be understood that each of the elements described above, or two or more together, may also find a useful application in other types of constructions differing from the types described above.

While the invention has been illustrated and described as embodied in a vehicle brake system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a vehicle brake system having a fluid-operated main braking circuit for actuating the vehicle brakes and reservoir means communicating with said main braking circuit and normally containing operating fluid under pressure, a backup braking circuit for actuating the vehicle brakes in the event of failure of the main braking circuit, said backup circuit comprising a braking unit having a first cylinder, a piston fluid-tightly shiftable in said first cylinder between two positions in one of which it actuates the vehicle brakes, and biasing means at one side of said piston and permanently urging the same to said one position; first passage means connecting said reservoir means with said first cylinder at the other side of said piston so that the latter is urged by fluid pressure to the other of said positions counter to said biasing means; a check valve in said passage means for normally permitting fluid flow only in direction into said first cylinder; a control circuit for said check valve, comprising a second cylinder, a control member shiftable in said second cylinder to and away from a control position in which it displaces said check valve in a sense permitting fluid flow out of said first cylinder, a biasing element urging said control member from one side to said control position, and second passage means communicating with said second cylinder at the other side of said control member and with said reservoir means so that said control member is urged by fluid pressure away from said control position; and a control unit manually operable by a vehicle operator and comprising first and a second control valve in said first and second passage means, respectively, and actuatable in response to operation of said control unit for venting said first and second passage means.

2. In a vehicle brake system as defined in claim 1; further comprising throttling means associated with said first passage means intermediate said check valve and said first control valve and operative for throttling the flow of fluid out of said first cylinder in automatic response to a predetermined drop of pressure in said first passage means.

3. In a vehicle brake as defined in claim 2, said first passage means comprising a passage portion having a predetermined cross-sectional area, and said throttling means comprising a throttling member having a part movable into said position for decreasing said cross-sectional area.

4. In a vehicle as defined in claim 3, said throttling means further comprising a third cylinder adjacent said passage portion, said throttling member being received and fluid-tightly displaceable in said third cylinder to and from a throttling position in which said part extends into said passage portion, a biasing member at one side of said throttling member urging the same to said throttling position, and a conduit connecting said first passage means with the interior of said third cylinder at the other side of said throttling member so that the latter is urged from said throttling position counter to said biasing member by fluid pressure prevailing in said passage portion.

5. In a vehicle as defined in claim 4, said conduit communicating with said first passage means intermediate said passage portion and said first control valve.

6. In a vehicle as defined in claim 4; further comprising housing means accommodating both said second and third cylinders.

7. In a vehicle as defined in claim 6, said second and third cylinders being unitary with one another and with said housing means.

8. In a vehicle as defined in claim 6, said housing means having two spaced opposite outer walls; and said control member and said throttling member each comprising a piston portion and a rod portion projecting from the respective piston portion; and wherein the respective piston portions and associated biasing element and biasing member are inwardly adjacent one another spaced from said outer walls, and the respective rod portions are outwardly spaced from one another adjacent the respective outer walls.

9. In a vehicle as defined in claim 6, said second and third cylinders being axially aligned and separated by an end wall common to them both; and wherein said biasing element and said biasing member bear against opposite sides of said end wall and against said control member and throttling member, respectively.

10. In a vehicle as defined in claim 4, said control member and throttling member as well as the respectively associated second and third cylinders each comprising cooperating abutments engageable in a sense preventing movement of said members beyond said control position and said throttling position, respectively.

11. In a vehicle as defined in claim 10, said abutments on said control member and said throttling member being radial abutment shoulders.

12. In a vehicle as defined in claim 4, wherein said control member and said throttling members are of identical configuration and dimensions.